United States Patent
Wilbuer et al.

(10) Patent No.: US 7,295,646 B1
(45) Date of Patent: Nov. 13, 2007

(54) METHOD FOR PRODUCING A COATING FOR ABSORPTION OF NEUTRONS PRODUCED IN NUCLEAR REACTIONS OF RADIOACTIVE MATERIALS

(75) Inventors: Klaus-Leo Wilbuer, Solingen (DE); Rudolf Diersch, Essen (DE); Hermann Stelzer, Aachen (DE); Matthias Patzelt, Wiesbaden (DE); Dieter Methling, Hattingen (DE)

(73) Assignees: Metallveredlung GmbH & Co. KG (DE); GNS Gesellschaft fur Nuklear-Service mbH (DE)

( * ) Notice: Subject to any disclaimer, the term of this patent is extended or adjusted under 35 U.S.C. 154(b) by 903 days.

(21) Appl. No.: 09/856,816

(22) PCT Filed: Sep. 27, 1999

(86) PCT No.: PCT/EP99/07166
§ 371 (c)(1),
(2), (4) Date: Aug. 6, 2001

(87) PCT Pub. No.: WO01/24198
PCT Pub. Date: Apr. 5, 2001

(51) Int. Cl.
*G21C 7/00* (2006.01)
*G21C 11/00* (2006.01)
(52) U.S. Cl. .............. 376/327; 376/414; 250/518.1
(58) Field of Classification Search ........... 376/327, 376/272, 339, 412; 250/515.1, 518.1
See application file for complete search history.

(56) References Cited

U.S. PATENT DOCUMENTS

| | | | | |
|---|---|---|---|---|
| 3,411,999 A | * | 11/1968 | Weinberg | 204/141 |
| 3,625,821 A | | 12/1971 | Ricks | 176/68 |
| 3,859,533 A | | 1/1975 | Suvanto | 250/507 |
| 4,218,622 A | | 8/1980 | McMurtry et al. | 250/518 |
| 4,227,928 A | | 10/1980 | Wang | 75/238 |
| 4,238,299 A | | 12/1980 | Wang | 204/16 |
| 4,824,634 A | | 4/1989 | Fuhrman et al. | 376/419 |
| 4,865,645 A | * | 9/1989 | Planchamp | 75/244 |
| 4,880,597 A | | 11/1989 | Bryan et al. | 376/419 |
| 5,222,542 A | * | 6/1993 | Burke | 164/97 |
| 5,372,701 A | * | 12/1994 | Gerdon et al. | 205/210 |
| 5,853,561 A | * | 12/1998 | Banks | 205/646 |
| 6,054,177 A | | 4/2000 | Endoh et al. | 427/203 |

FOREIGN PATENT DOCUMENTS

| | | |
|---|---|---|
| DE | WO 9636972 | 11/1996 |
| DE | WO 9859344 | 12/1998 |
| EP | 0 016 252 A1 | 11/1979 |
| EP | 0 385 187 A1 | 2/1990 |
| JP | 59102953 | 6/1984 |
| JP | 60235096 | 11/1985 |

OTHER PUBLICATIONS

Boron: Definition and Much More From Answers.com available @ http://www.answers.com/boron, last accessed Nov. 8, 2005, p. 4 of 7.*
International Search Report; International Publication No. WO 01/24198A1 (Application No. PCT-EP 99/07166); International Publication Date Apr. 5, 2001.

* cited by examiner

*Primary Examiner*—James P. Trammell
*Assistant Examiner*—Daniel L Greene, Jr.
(74) *Attorney, Agent, or Firm*—Cantor Colburn LLP

(57) ABSTRACT

The invention relates to a method for producing a coating for absorption of neutrons produced in nuclear reactions of radioactive material which can be applied in an economically feasible and simple manner, increases the effectivity of absorption, enables greater variability of base material used and variability of shape of said shielding elements and in particular the production of lighter shielding elements with at least the same absorption quality. The invention also relates to a method for producing a coating for absorption of neutrons produced in nuclear reactions of radioactive materials. At least one part of a shielding element consisting of base material is provided at its surface designed therefore with a layer made of an element with a high neutron capture section and a metallic element in a dispersion bath. Said metallic element can be deposited by electrolytic or autocatalytic means. During the coating process, a relative movement between a surface to be coated and a dispersion bath is effected at least temporarily, whereby the element with a larger neutron capture section is present in an electrically conducting compound in said dispersion bath.

10 Claims, No Drawings

METHOD FOR PRODUCING A COATING FOR ABSORPTION OF NEUTRONS PRODUCED IN NUCLEAR REACTIONS OF RADIOACTIVE MATERIALS

TECHNICAL FIELD

This invention relates to a method for producing a coating designed to absorb the neutrons which are generated in the nuclear reaction of radioactive materials. The invention also covers an absorber produced by said method.

BACKGROUND OF THE INVENTION

Depending on their purpose, material and condition, radioactive substances, especially those derived from the operation of nuclear reactors, when to be replaced and/or tested and transported and/or stored, are shielded from one another to prevent any further nuclear reactions engendered by their inevitably emitted neutrons. For ensuring the desired level of neutron absorption it has been customary to employ absorbers in the form of various storage shafts, canisters, tubes and similarly configured containers surrounding and thus shielding a neutron-emitting object. The use of such absorbers permits for instance the compact storage of neutron-emitting elements, especially fuel rods from nuclear power plants.

EP 0 385 187 A1 describes a fuel-rod storage rack where a number of absorber sheets form multiple shafts which enclose the fuel rods over their entire length. These absorbers are shafts or tubes which consist of a neutron-absorbing material, such as boron steel, i.e. an alloy steel with a boron concentration of 1 to 2%. Apart from the complexity of producing these absorbers, they are exceedingly cost-intensive, yet their effectiveness is limited due to the low boron content. In an attempt to increase the boron content, the deposition of a boron-nickel alloy was investigated. While the boron concentration can be increased up to 8%, the attendant cost increases by a factor of 10, ruling out any cost-effective use of this type of storage tubes.

For other purposes such as the transport and/or storage of radioactive materials, processes have been employed whereby layers of nickel are deposited on the metal surfaces of the containers.

U.S. Pat. No. 4,218,622 describes a composite absorber where a thin carrier foil or thin carrier sheet is coated with a polymer matrix in which boron carbide particles are embedded. The base material of the carrier foil or carrier sheet is preferably a fiberglass-reinforced polymer. The boron carbide particles are evenly distributed over the surface of the polymer matrix at a concentration of up to 0.1 g/cm$^2$. When used in a fuel rod storage rack, this composite absorber is in the form of a foil or sheet up to 7 mm thick, suspended between an inner wall and an outer wall. U.S. Pat. No. 4,218,622 does not indicate whether a homogeneous distribution of the boron carbide particles over the surface of the polymer matrix can be assured in the long run, especially in view of possible surface abrasion.

EP 0 016 252 A1 describes a method for producing a neutron absorber. The process involves the plasma spraying of boron carbide, together with a metallic substance, onto a substrate, causing the boron carbide to be embedded in a matrix of the metallic substance. The process is also designed in a way that any oxidation of the boron is avoided. The absorber thus produced is intended to be chemically stable against a liquid medium such as that present in a fuel rod storage basin. The metal and boron-carbide layer applied by plasma spraying is at least 500 μm thick. The boron carbide content is about 50% by volume. Suitable metallic substances include aluminum, copper and stainless steel, with the substrate containing the same metallic substance as that in the sprayed-on layer. Obtaining sufficiently effective neutron absorption requires a relatively thick boron carbide-based layer. Specifically, the thickness of the layer is 3 to 6 mm.

The German provisional patent DE-AS 1.037.302 and German patent DE 2.361.363 describe a process whereby tubes and especially tin cans are electrolytically coated on their outer surfaces with an absorber material that protects them against radioactive radiation. Neither DE-AS 1.037.302 nor DE 2.361.363 provides any information on the procedural steps or equipment for the technical implementation of the change of the physiochemical state and material conversion involved in the application of the absorption material.

EP 0 055 679 A2 describes methods for producing shielding elements, whereby boron carbide is applied on the surface of the shielding element either by plasma coating or, following an electrolytic or chemical nickel preplating of the shielding element, by sprinkling boron carbide powder onto the surface, whereupon the shielding element is again nickel-plated by an electrolytic or chemical process. These methods allow only small amounts of boron carbide, on the order of magnitude of 20% by weight relative to the nickel content, to be applied on the surface. Consequently, very thick coatings are needed, so that these prior-art methods are not cost-effective. Nor have these methods really been employed in practice since from the process point of view they are not fully implementable. Sprinkling a powder on a surface is not a procedure that assures reliability in industrial production.

All of the prior-art methods and processes and the shielding elements produced by them can be considered uneconomical due to high production costs and material expenditures. Moreover, they limit variability in terms of the design of the shielding elements and any enhancement of their possible uses.

Producing boron steel is an extremely complex process. The steel is melted, the boron is enriched by complex methods to a valence of up to 10 and mixed with the molten steel. The result is boron steel containing boron at 1.1 to 1.4% by weight. This steel is very difficult to machine, it is extremely brittle and cannot be easily welded. Shielding elements produced from it are extremely heavy while offering only average absorption properties. As an example, storage container inserts, known as baskets, used for the interim storage of fuel rods, weigh as much as about 10 tons.

WO 98/59344 describes a method for producing a neutron-absorbing coating whereby the appropriate surfaces of a shielding element are provided with a boron-nickel layer, for which purpose the dispersion bath contains boron in its elemental form or as boron carbide. While it is possible to obtain a high rate of boron embedment, that rate is limited when boron is to be embedded in its elemental form, the layer is very hard and thus very brittle. Boron carbide offers only low conductivity, i.e. semiconductive characteristics at best, making it difficult if not impossible to control an electrolytic process. That in turn allows layers to build up only slowly and in poorly structured form. The relative movement involved results in a certain randomness in the structural pattern of the layer. That makes the process in general quite expensive since it is highly complex in terms of the materials used, process control and other parameters.

SUMMARY OF THE INVENTION

In view of this state of prior art, it is the objective of this invention to introduce an improved method for producing a layer, or shielding elements, for absorbing the neutrons generated in the nuclear reaction of radioactive materials, a method which is cost-effective and easy to implement, which offers enhanced absorption efficacy, which permits greater variability in terms of the base materials and the design of the shielding elements as well as good process control, and, most particularly, which allows for the production of absorbers that combine lighter weight with at least the same absorption capacity.

DETAILED DESCRIPTION OF THE INVENTION

Proposed as the technical solution for meeting this objective is a method for producing a coating designed to absorb the neutrons generated in the nuclear reaction of radioactive materials, whereby, in a dispersion bath, at least part of a shielding element consisting of a base material is provided on its appropriately predefined surfaces with a layer, consisting of an element with a high neutron-capture capability and a metallic, electrolytically or autocatalytically precipitable element, in which process a relative movement is at least intermittently produced during the coating cycle between the respective surface to be coated and the dispersion bath while the element with the high neutron-capture capability is present in the dispersion bath in the form of an electrically conductive compound.

It has been found that forming for instance a boron-nickel layer in a dispersion bath with a periodic relative movement between the surface to be coated and the dispersion bath yields very good results. Using electrically conductive compounds of elements with a high neutron capture capability permits good control of the electrolysis and, surprisingly, it has been found that the embedment rates can be significantly augmented. That in turn allows for the use of much thinner layers.

Suitable elements with a high neutron capture capability include elements of the group comprising boron whether in elemental form or as boron carbide, gadolinium, cadmium, samarium, europeum or dysprosium. The high neutron capture capability is a function of the magnitude of the capture cross-section of the element concerned. Metal compounds have been found to be particularly suitable electric conductors. Among these are metal borides such as iron boride, nickel boride and the like. These are mentioned as examples only and with reference to these elements the list is expandable. Good conductivity means good electrolysis control, so that the method can be implemented under less stringent conditions, in highly dependable and reproducible fashion.

Metallic elements particularly suitable for electrolytic or autocatalytic deposition include nickel, cadmium or copper. The element with a high neutron capture cross-section, or a compound thereof, is embedded in this metal matrix for corresponding effectiveness.

As a particularly advantageous approach it is proposed to employ the isotopes of the elements which display an enlarged neutron capture cross-section. It is a known fact, for example, that using $^{11}B$ represents a neutron capture cross section of 0.005 barn, while using the isotope $^{10}B$ represents 3837 barn. This makes thinner layers possible.

The high embedment rates thus result in far greater effectiveness. The absorption layers are produced in orders of magnitude of up to 800 μm. In addition, a particular advantage lies in the fact that the process is independent of the type of base material. In advantageous fashion an inorganic base material is employed, such as steel, stainless steel, boron steel, titanium, aluminum, copper, nickel and the like, including their corresponding alloys. Although organic, even a carbon fiber material can serve as a possible base material. The particular advantage of carbon fiber material is that the absorption element can be produced by electroplating techniques.

According to the invention, it is further possible to manufacture the absorber as a finished product or as individual components. Given the independence of the process from the base material, easily machinable materials can be used. By the same token, highly complex designs of absorbers, containers, baskets etc. can be completely prefabricated and then coated in accordance with this invention.

The high embedment rate makes the shielding exceedingly effective, allowing for the use of extremely thin layers. Compared to shielding elements produced by conventional methods, a weight reduction by up to 50% is possible. By employing the method per this invention, the 10-ton storage container inserts (baskets) currently used for storing fuel rods can now be produced in weight sizes from 4 to 6 tons.

The base material can be prefabricated as finished units or as components from which latter complete absorbers can be assembled. The assembly of absorbers or absorber components into complete storage racks or transport baskets can be performed in friction-mounted or form-locking fashion. The invention even permits the coating of complete storage racks and transport baskets. The plating in the dispersion bath is performed either chemically or by electrolysis.

The relative movement between the surface to be coated and the dispersion bath can be accomplished for instance by moving the object to be coated in the dispersion bath. As is commonly known, elements such as boron etc. are of a nature which hardly allows for a cost-effective way to circulate or pump the dispersion around it. Any circulation or rotating system would be worn in short order. Yet the relative movement is intended to permit good continued or repeated mixing of the dispersion while assuring a directionally specific feed of the dispersion onto the surface to be coated. Apart from the movement of the object itself, the entire coating system may be moved for the purpose of creating the relative movement. For example, a type of drum may be considered for the coating process. The relative movement may also be created by mechanically moving the bath, by blowing in gas and especially air, by ultrasonic means, or any combination thereof.

Within the scope of the invention it is proposed as a particularly advantageous step that in the dispersion bath the surface to be coated point upward. In other words, the surface to be coated should be so positioned in the dispersion bath that by virtue of gravity the particles contained in the dispersion sink down onto that surface. As part of the invention, this configuration, in conjunction with the periodic relative movement between the surface and the dispersion bath, tends to bring about excellent coating results.

As an especially advantageous feature of the invention it is proposed to perform the coating process in a ceramic or glass vessel which ensures a particularly pure dispersion bath.

The invention introduces an easy-to-perform, cost-effective and highly efficacious method for producing absorbers for neutron absorption, permitting in particular the base-material-independent fabrication of absorbers which, at comparable levels of absorptivity, weigh considerably less than conventional shielding elements.

The invention further relates to absorbers produced by the method described. These are characterized in that they are coated with a layer consisting of an element with a high neutron capture cross-section and of nickel, wherein the element or a compound thereof with a high neutron capture cross section is present at a concentration of up to 60% by volume or, respectively, 40% by volume. The layer is 350 to 500 and up to 800 μm thick and is formed on an inorganic base material such as steel, titanium, copper or the like. Layer thicknesses of up to 2000 μm are feasible. The layers are formed chemically or by electrolysis. The shielding element can be coated either as a finished product or assembled from individually coated components. Examples of suitable electrolytes include surface-leakage current-free nickel-phosphorus or electrolytic nickel.

As part of a test, conventional steel plates were electrolytically plated in a nickel/boron carbide dispersion bath. The steel plates were turned in the bath every half hour and intermittently moved up and down in order to create a relative movement between the surfaces and the dispersion bath, but also to turn the surface to be coated so as to face upward within the bath. As verified in subsequent analyses, it was possible to embed boron carbide in the nickel matrix at a concentration in the range of 40% by volume.

The invention claimed is:

1. A method for producing a coating for absorption of neutrons generated in nuclear reaction of radioactive materials on a shielding element at least partly, the method comprising:

providing a shielding element having a base material and appropriately predefined surfaces;

providing a dispersion bath comprising a first substance having a high neutron capture cross-section and a second substance being electrolytically precipitable metallic wherein the first substance is in a form of an electrically conductive compound;

submerging said shielding element at least partly with appropriately predefined surfaces to be coated into said dispersion bath;

intermittently generating a relative movement between the respective surface to be coated and the dispersion bath during the coating process; and removing the shielding element from said dispersion bath.

2. The method as set forth in claim 1, wherein the second substance is one element of the group that consists of nickel, cadmium and copper.

3. The method as set forth in claim 1, wherein the first substance is at least one of the elements of the group that consists of boron, gadolinium, cadmium, samarium, europium and dysprosium.

4. The method as set forth in claim 3, wherein the first substance is an isotope having an augmented neutron capture cross-section.

5. The method as set forth in claim 1, wherein the electrically conductive compound of the first substance is a metallic compound.

6. The method as set forth in claim 5, wherein the electrically conductive compound of the first substance is metal boride.

7. The method as set forth in claim 1, wherein the relative movement is generated by moving the surface to be coated.

8. The method as set forth in claim 1, wherein the relative movement is generated by blowing in a gas and/or by introducing ultrasound waves.

9. The method as set forth in claim 1, wherein the dispersion bath is thoroughly mixed at least periodically during the coating process.

10. The method as set forth in claim 1, wherein the process is performed in a ceramic or glass vessel.

* * * * *